(12) United States Patent
Nyhus

(10) Patent No.: US 6,170,779 B1
(45) Date of Patent: Jan. 9, 2001

(54) ROTOR PITCH LOCK FOR ROTARY/WING AIRCRAFT

(75) Inventor: Daniel A. Nyhus, Gilbert, AZ (US)

(73) Assignee: McDonnell Douglas Helicopter Company, Mesa, AZ (US)

(*) Notice: Under 35 U.S.C. 154(b), the term of this patent shall be extended for 0 days.

(21) Appl. No.: 09/204,627

(22) Filed: Dec. 2, 1998

(51) Int. Cl.[7] .................................................. B64C 27/24
(52) U.S. Cl. .................. 244/7 A; 244/17.11; 244/17.25; 416/142; 416/153
(58) Field of Search .............................. 244/17.11, 17.25, 244/7 R, 7 A; 416/140, 107, 142, 143, 153

(56) References Cited

U.S. PATENT DOCUMENTS

| | | | |
|---|---|---|---|
| 3,986,686 | * 10/1976 | Girard | 244/7 A |
| 5,951,252 | * 9/1999 | Muylaert | 416/140 |
| 6,032,899 | * 3/2000 | Mondet et al. | 244/17.25 |

* cited by examiner

Primary Examiner—Galen L. Barefoot
(74) Attorney, Agent, or Firm—Bryan Cave LLP

(57) ABSTRACT

The present invention comprises an apparatus for locking the pitch axes of the rotor blades of a rotor/wing aircraft so as to form a rigid wing. In one embodiment of the present invention the rotor blades of a rotor/wing aircraft are locked to each other to form a rigid wing assembly having a common pitch axis. This wing assembly is then locked in position about its pitch axis by means of a pitch lock apparatus that engages the lower end of the pitch link of the rotor blade that is oriented at the leading edge of the fixed wing. In another embodiment each rotor is independently locked about its respective pitch axis by means of two separate pitch lock apparatus. By locking the rotor blades into a rigid assembly by means of an independent rigid pitch lock apparatus, it is possible to provide a rotor/wing aircraft having a fixed wing with more predictable and controllable response to aerodynamic forces.

12 Claims, 3 Drawing Sheets

ROTOR PITCH LOCK FOR ROTARY/WING AIRCRAFT

BACKGROUND OF THE INVENTION

This invention relates generally to aircraft capable of combined rotary wing and fixed wing flight and, more particularly, to apparatus for controlling movement of the rotor blades of such aircraft.

Rotor/wing aircraft such as the aircraft disclosed in U.S. Pat. No. 5,454,530 titled "Canard Rotor/Wing" are capable of operation in both a helicopter and a fixed-wing mode of flight. In order to achieve this dual mode flight, a rotor/wing aircraft is equipped with a rotating hub, similar to the rotating hub of a helicopter, to which are attached a plurality of rotor blades extending radially outward from the hub. In the first flight regime the hub and rotor blades are rotated in a manner similar to that of a helicopter. This enables the aircraft to move vertically, hover, and fly translationally at relatively slow speeds. In the second flight regime, the rotor is locked with the rotor blades positioned to operate as fixed wings, thereby enabling the aircraft to fly at relatively high speeds configured as a conventional fixed-wing aircraft.

In order to enable a rotor/wing aircraft to operate in the helicopter mode, the blades of the rotor/wing must be free to rotate about their respective pitch axes in response to the control inputs. As with a conventional helicopter, the longitudinal and lateral rotor blade cyclic pitch control as well as the average rotor blade pitch (collective) are transmitted the rotor blades by means of a rotor blade swashplate mechanism. Pilot control inputs are translated into elevation and tilt angle of the swashplate which are transmitted to the rotor blades by means of pitch links attached to the leading edges of the blades.

For the rotor/wing aircraft to operate in fixed wing mode, however, the rotor blades must be locked into a rigid assembly. The relatively low stiffness of the rotor swashplate mechanism and its actuators and the potential for brinelling of the loaded static rolling bearings of the rotor swashplate mechanism preclude effective use of the rotor swashplate mechanism as a means for securing the rotor blades for fixed wing flight. Accordingly, it is desirable to provide an independent, rigid mechanism for securing rotor blades about their pitch axes during fixed wing flight.

SUMMARY OF THE INVENTION

The present invention comprises an apparatus for locking the pitch axes of the rotor blades of a rotor/wing aircraft so as to form a rigid wing. In one embodiment of the present invention the rotor blades of a rotor/wing aircraft are locked to each other to form a rigid wing assembly having a common pitch axis. This wing assembly is then locked in position about its pitch axis by means of a pitch lock apparatus that engages the lower end of the pitch link of the rotor blade that is oriented at the leading edge of the fixed wing. In another embodiment each rotor blade is independently locked about its respective pitch axis by means of two separate pitch lock apparatus.

By locking the rotor blades into a rigid assembly by means of an independent rigid pitch lock apparatus, it is possible to provide a rotor/wing aircraft having a fixed wing with more predictable and controllable response to aerodynamic forces.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
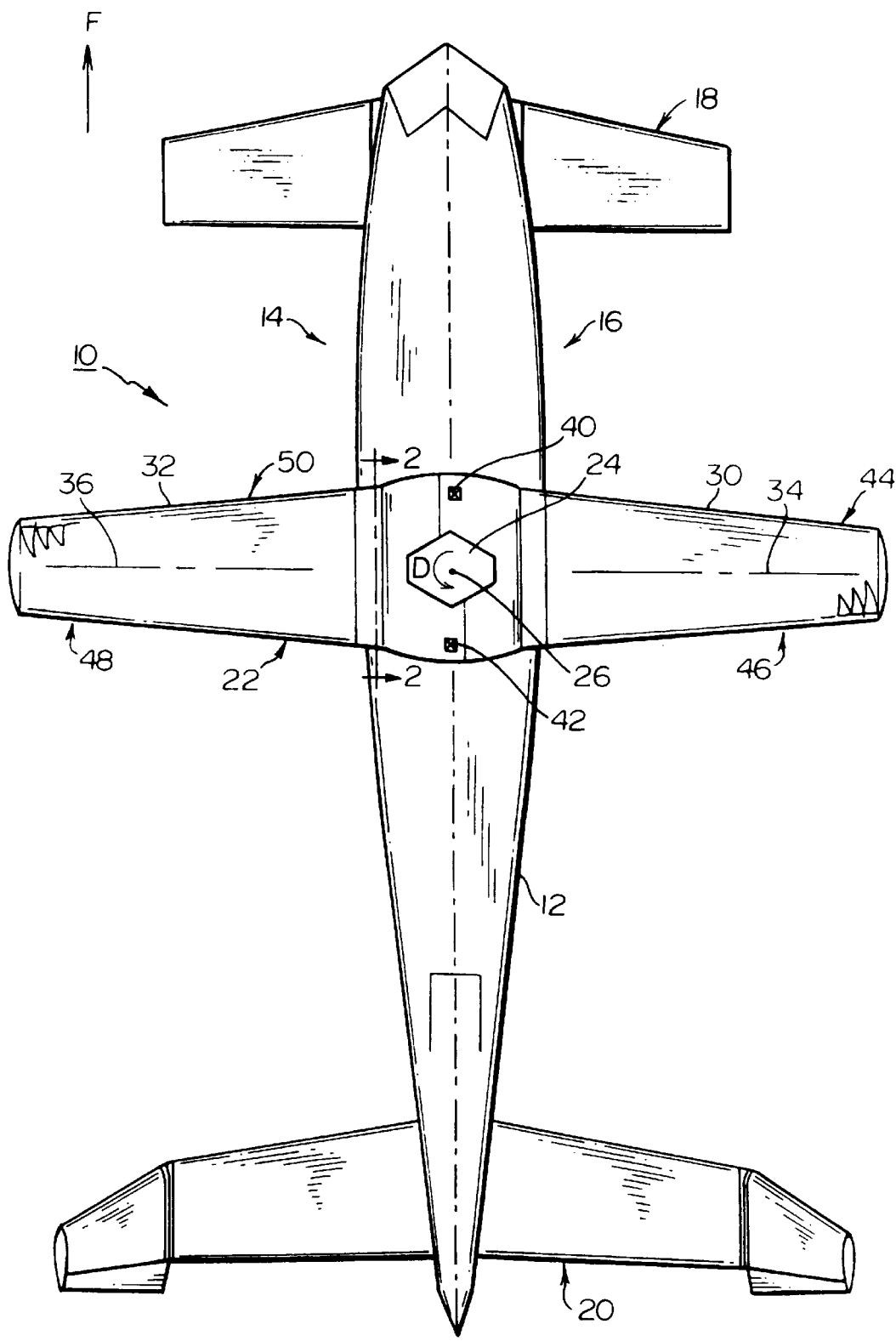
FIG. 1 is a diagrammatic top plan view of a rotor/wing aircraft that may advantageously incorporate a pitch lock apparatus incorporating features of the present invention.

The drawing figures are intended to illustrate the general manner of construction and are not necessarily to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

FIG. 1 is a diagrammatic plan view of a rotor/wing aircraft that may advantageously incorporate a rotor blade pitch lock apparatus in accordance with the present invention. Aircraft 10 comprises a fuselage 12 having a port side 14 and a starboard side 16. Fuselage 12 supports a front canard 18, a rear lifting tail 20, and a rotor/wing 22. Rotor/wing 22 comprises a hub 24 which, in helicopter mode, rotates in a direction "D" about an azimuthal axis 26. Attached to and extending radially outward from hub 24 are rotor blades 30 and 32. As is evident from an examination of FIG. 1, when hub 24 is rotating, rotor blade 30 has a leading edge 44 and a trailing edge 46 and rotor blade 32 has a leading edge 48 and a trailing edge 50. Rotor blades 30 and 32 are pivotally mounted to hub 24 in a conventional manner to permit each to pivot independently about their respective pitch axes 34 and 36. Control of the cyclic and collective pitch of each of rotor blades 30 and 32 are provided by pitch links 40 and 42 in a manner similar to that of conventional helicopter pitch control mechanisms. Pitch link 40 is attached to rotor blade 30 near leading edge 44 and pitch link 42 is attached to rotor blade 32 near leading edge 48.

In fixed-wing mode, hub 24 is locked with a fixed azimuthal orientation, for example with rotor blade 30 on the starboard side 16 of the aircraft and rotor blade 32 on the port side 14. (Alternatively, hub 24 may be locked with the position of the rotor blades reversed i.e. with rotor blade 30 on the port side 14 and rotor blade 32 on the starboard side 16.) The pitch of both rotor blades 30 and 32 are then fixed in position relative to fuselage 12 to create a solid fixed wing having a uniform angle of attack. In the configuration shown in FIG. 1, with the aircraft flying in the direction indicated as "F," although rotor blade 30 is flying with its leading edge 48 forward, rotor blade 32 is, in effect, flying backwards. Accordingly, leading edge 48 of rotor blade 32 becomes a trailing edge in fixed wing flight.

In a first embodiment of a pitch lock apparatus incorporating features of the present invention, rotor blade 30 is preferably locked to rotor blade 32 to form a solid wing pivotable about a common pitch axis 34, 36. A pitch lock apparatus is then engaged with the pitch link of the rotor blade that is at the leading edge of the fixed wing. Controlling the leading edge pitch link provides leading edge pitch control of the fixed wing. Leading edge pitch control is inherently stable because it negatively feeds-back wind gust loading and other wing disturbances. For example, a wind gust load that tended to pitch rotor blade 30 upward would result in an elongation of the structure supporting rotor blade 30. The resulting elongation reacted through link 40 would cause blade 30 to pitch down (negative feedback) in an amount proportional to the magnitude of the disturbance, thereby resulting in a stable system. Trailing edge control, conversely, is inherently unstable because it positively feeds-back wing perturbations. It was determined by the inventor of the present invention that an apparatus for providing leading edge control for both rotor blades when locked in fixed-wing mode would be preferable in terms of flight stability over simply securing both pitch links.

Figure 2:
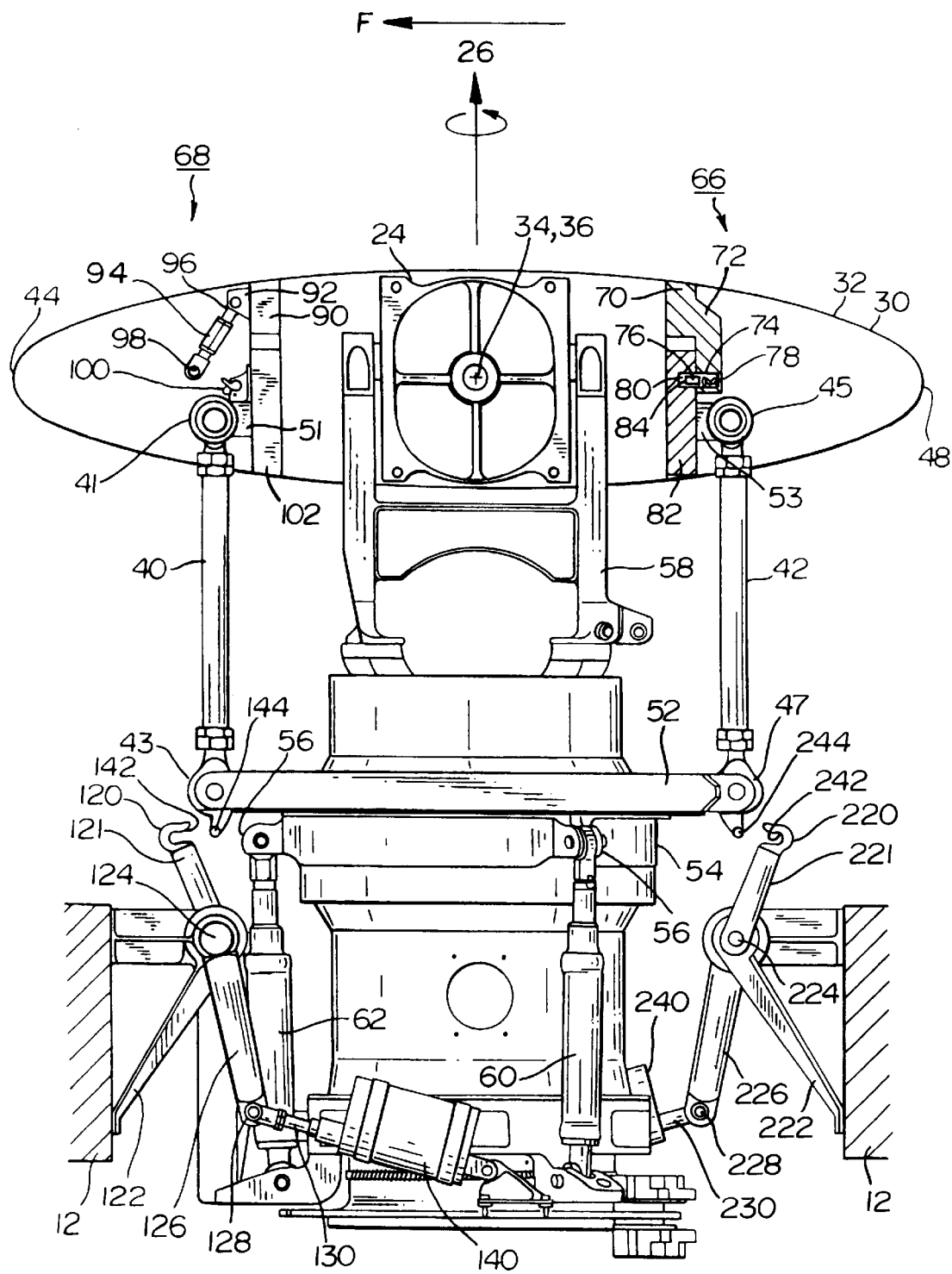
FIG. 2 is a partial side view of a rotor/wing assembly incorporating a pitch lock apparatus in accordance with the present invention.

FIG. 2 is a partial plan view taken along line 2—2 of FIG. 1 depicting a rotor/wing assembly having a pitch lock apparatus incorporating features of the present invention. The rotor wing assembly comprises left and right rotor blades 32 and 30 affixed to hub 24, which is supported by a rotating mast 58 to rotate about azimuthal axis 26. Pitch link 40 is attached at upper end 41 to a flange 51 proximal leading edge 44 of rotor blade 30 and pitch link 42 is attached at upper end 45 to a flange 53 proximal leading edge 48 of rotor blade 32. Pitch links 40 and 42 are attached at their lower ends 43, 47 to a rotating swashplate 52, which rotates along with hub 24, links 40 and 42 and the rest of the rotor/wing 22 about azimuthal axis 26.

Rotating swashplate 52 slidingly engages non-rotating swashplate 54. Non-rotating swashplate is attached in a conventional manner to swashplate actuators 60, 62 and 64 (64 not shown) attached to flanges 56 disposed around the perimeter of non-rotating swashplate 54. Non-rotating swashplate is elevated and/or tilted by swashplate actuators 60, 62, and 64 in conventional fashion of a rotor/swashplate mechanism to induce the appropriate collective and/or cyclic pitch in blades 30 and 32 for helicopter flight.

The illustrative embodiment of FIG. 2 incorporates a blade lock apparatus to lock blades 30 and 32 together prior to the pitch lock apparatus engaging the appropriate leading edge pitch link. The blade locking apparatus is releasable by centrifugal force such that when rotor/wing 22 is rotating about azimuthal axis 26 above a certain threshold angular velocity, the blade locking apparatus is disengaged, but when the angular velocity of the rotor/wing 22 drops below the threshold (indicating that rotor/wing 22 is about to be locked in position for fixed wing flight), the locking apparatus automatically engages to lock the rotor blades together. Once locked together, the blades form a single rigid wing assembly that can be controlled by securing the pitch link of the blade that has its pitch link oriented at the leading edge of the wing assembly.

Two embodiments of a blade locking apparatus are depicted in FIG. 2. In a first embodiment of a blade lock apparatus 66, a bulkhead 70 within rotor blade 32 includes a bulkhead extension 72 into which a counterbore 74 is disposed. A locking pin 76 is slidably disposed in counterbore 74 and urged by a resilient member such as spring 78 toward the open end of counterbore 74. A corresponding counterbore 80 is disposed in bulkhead 82 of rotor blade 30. As rotor/wing 22 rotates about azimuthal axis 26, centrifugal force acting on locking pin 76 causes it to retract into counterbore 74 until the distal end 84 of locking pin 76 clears counterbore 80, permitting rotor blade 32 to rotate about axis 36 relative to rotor blade 30.

In a second and preferred embodiment of a blade locking apparatus 68, a bulkhead 90 within rotor blade 30 includes a flange 92. A locking link 94 is pendulously attached to flange 92 at its upper end 96 so as to swing freely. The lower end 98 of link 94 is adapted to engage a lock engaging surface 100 attached to a bulkhead 102 within rotor blade 32. As rotor/wing 22 rotates about azimuthal axis 26, centrifugal force acting on locking link 94 causes it to swing radially outward from bulkhead 90, thereby causing lower end 98 to disengage lock engaging surface 100, thereby permitting rotor blade 30 to rotate about axis 36 relative to rotor blade 32.

With reference to FIG. 2, once blades 30 and 32 are locked together by means of blade locking apparatus 66 or 68, although the blades cannot pivot independently, depending on the geometry of the particular rotor blade swashplate mechanism, it may be possible for the entire wing to pitch up or down unless constrained. Although the rotor swashplate mechanism could theoretically be utilized to control the pitching of the wing, the relatively low stiffness of the rotor swashplate mechanism and the actuators 60, 62, and 64 render use of the swashplate mechanism impractical for locking the blades about their pitch axes with the structural rigidity necessary for fixed wing flight. Accordingly, a separate rigid pitch lock apparatus is desirable As shown in FIG. 2, a pitch lock apparatus 120 comprises a locking arm 121 pivotally mounted to shaft 124 extending through a support frame 122 attached to fuselage 12. Bell crank arm 126 is rigidly attached to the opposite end of shaft 124. The free end 128 of bell crank arm 126 is pivotally attached to an actuator rod 130 of a conventional linear actuator 140. As rod 130 of linear actuator 140 is extended, locking arm 121 moves through an arc until hook 142 of arm 121 engages a pin 144 extending from the lower end 43 of pitch link 40, thereby directly securing pitch link 40 to fuselage 12. The arrangement of locking arm 121 and bell crank arm 126 through support frame 122 permits locking arm 121 to move through an arc within a radial plane relative to azimuthal axis 26 while permitting actuator 140 to be offset from the centerline of azimuthal axis 26.

Although the preferred embodiment of a pitch lock apparatus in accordance with the present invention 120 comprises a single pitch lock apparatus 120 cooperating with a blade lock apparatus, 66 or 68, a second pitch lock apparatus 220 may be provided for example for applications where it is impracticable to provide a blade lock apparatus, or where a redundant pitch lock is advisable. As shown in FIG. 2, a second pitch lock apparatus 220 comprises, a locking arm 221 pivotally mounted to shaft 224 extending through a support frame 222 attached to fuselage 12. Bell crank arm 226 is rigidly attached to the opposite end of shaft 224. The free end 228 of bell crank arm 226 is pivotally attached to an actuator rod 230 of a conventional linear actuator 240. As rod 230 of linear actuator 240 is extended, locking arm 221 moves through an arc until hook 242 of arm 221 engages a pin 244 extending from the lower end 47 of pitch link 42, thereby directly securing pitch link 42 to fuselage 12. The arrangement of locking arm 221 and bell crank arm 226 through support frame 222 similarly permits locking arm 221 to move through an arc within a radial plane relative to azimuthal axis 26 while permitting actuator 240 to be offset from the centerline of azimuthal axis 26. Alternatively, to save weight and cost, instead of two linear actuators 140 and 240, both arms 121 and 221 could be actuated by a single actuator having dual outputs or by a single output actuator operating a toggle linkage disposed between arms 121 and 221 or via other conventional linkage.

Figure 3:
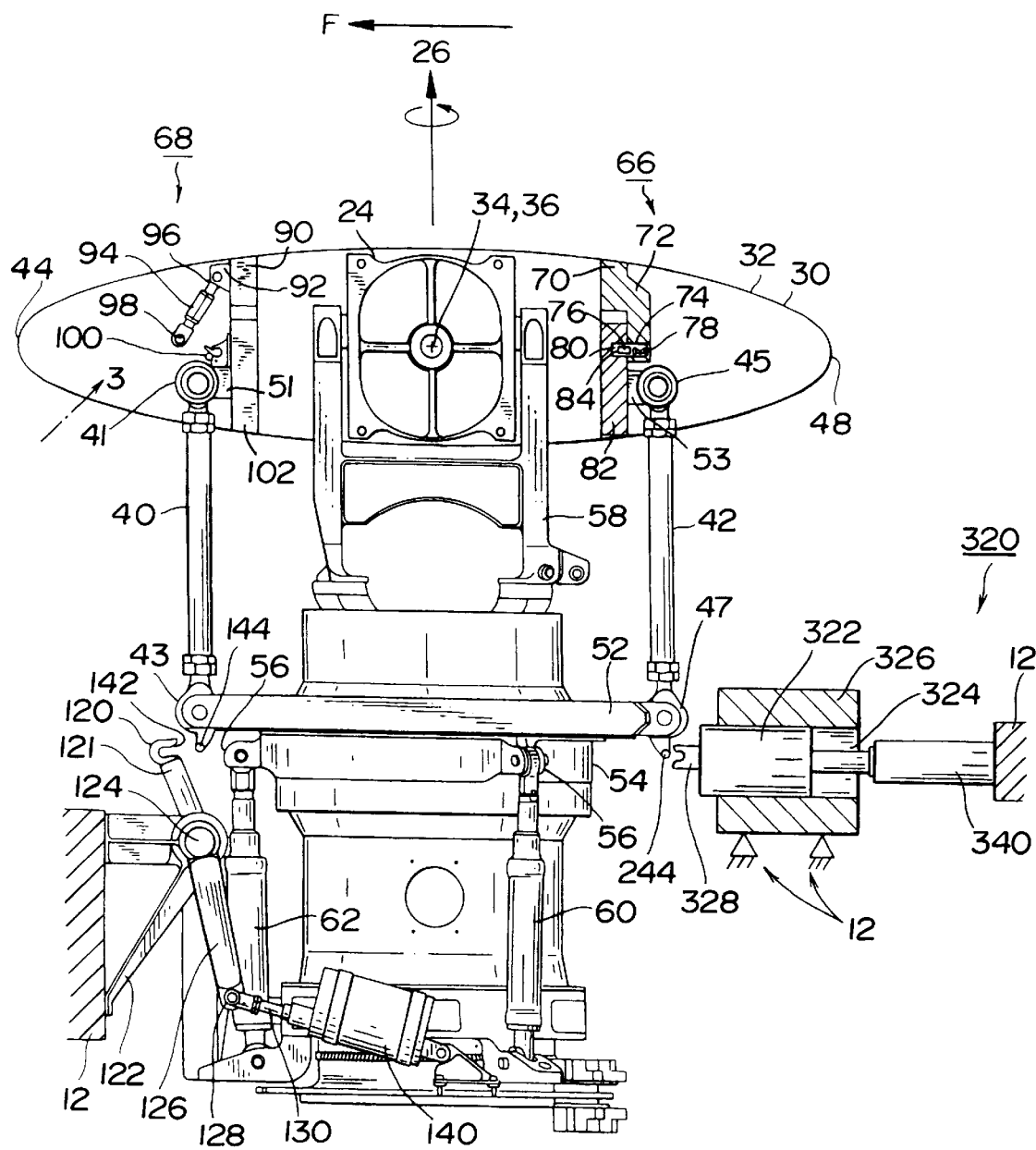
FIG. 3 is a partial side view of a rotor/wing assembly incorporating an alternative embodiment of a pitch lock apparatus in accordance with the present invention.

The present invention also is not limited to rotary locking arms. As shown in FIG. 3, an alternative embodiment of a pitch lock apparatus 320 comprises a piston 322 slidably disposed in a bore 324 in a housing 326 attached to fuselage 12. Piston 322 is attached to the actuator rod 330 of a linear actuator 340. As actuator rod 330 is extended, hook surface 328 engages pin 244 extending from the lower end 47 of pitch link 42 to secure pitch link 42 rigidly to fuselage 12. By locking pitch links 40 and/or 42 directly to fuselage 12 using pitch lock apparatus 120, 220 and/or 320, rather than reacting forces through swashplates 52 and 54, it is possible to achieve more precise and repeatable positioning of the pitch rotor/wing 22 as well as to reduce wear and tear on swashplates 52 and 54, actuators 60, 62 and 64, and the other components of the rotor swashplate mechanism.

Although certain preferred embodiments and methods have been disclosed herein, it will be apparent from the foregoing disclosure to those skilled in the art that variations and modifications of such embodiments and methods may be made without departing from the spirit and scope of the invention. Accordingly, it is intended that the invention shall be limited only to the extent required by the appended claims and the rules and principles of applicable law.

What is claimed is:

1. A rotor/wing apparatus for a rotor/wing aircraft comprising:
   a rotor hub rotatable about an azimuthal axis;
   a first rotor blade attached to and extending radially outward from said rotor hub, said first rotor blade being pivotable about a first pitch axis extending substantially radially outward from said azimuthal axis;
   a second rotor blade attached to and extending radially outward from said rotor hub, said second rotor blade being pivotable about a second pitch axis extending substantially radially outward from said azimuthal axis;
   a first pitch link having a first upper end and a first lower end, said first upper end being attached to said first rotor blade eccentric of said first pitch axis, said first pitch link being moveable in a direction substantially parallel to said azimuthal axis to cause said first rotor blade to pivot about said first pivot axis;
   a second pitch link having a second upper end and a second lower end, said second upper end being attached to said second rotor blade eccentric of said second pitch axis, said second pitch link being moveable in a direction substantially parallel to said azimuthal axis to cause said second rotor blade to pivot about said second pitch axis; and
   a locking link having a proximal end, said proximal end including a link engaging surface, said locking link being moveable to a first position in which said link engaging surface engages one of said first and second lower ends to constrain said one of said first and second lower ends against movement parallel to said azimuthal axis, said locking link being further moveable to a second position in which said proximal end moves in a radial direction relative to said azimuthal axis to disengage said link engaging surface from said one of said first and second lower ends.

2. The rotor/wing apparatus of claim 1, further comprising:
   a frame rigidly mounted to said rotor/wing aircraft
   a pivot shaft rotatably mounted to said frame, said pivot shaft having first and second shaft ends; and
   wherein said locking link further comprises an arm member having an attachment end attached to said first shaft end, said arm member being pivotable about said pivot shaft to move said proximal end from said first position to said second position.

3. The rotor/wing apparatus of claim 2, further comprising:
   an actuator attached to said pivot shaft for causing said locking link to move from said second position to said first position.

4. The rotor/wing apparatus of claim 2, further comprising:
   a bell crank arm attached to said second shaft end, said bell crank arm having a pivoting end and a free end; and
   a linear actuator attached to said free end, said linear actuator adapted to rotate said pivot shaft for causing said locking link to move from said second position to said first position.

5. The rotor/wing apparatus of claim 1, further comprising;
   a second locking link having a second proximal end, said second proximal end including a second link engaging surface, said second locking link being moveable to an engaged position in which said second link engaging surface engages the other of said first and second lower ends to constrain said other of said first and second lower ends against movement parallel to said azimuthal axis, said second locking link being further moveable to a disengaged position in which said second proximal end moves in a radial direction relative to said azimuthal axis to disengage said second link engaging surface from said other of said first and second lower ends.

6. The rotor/wing apparatus of claim 1, further comprising:
   a housing rigidly mounted to said rotor/wing aircraft, said housing defining a bore;
   wherein said locking link comprises a piston disposed within said bore, said piston being moveable linearly within said bore to move said proximal end from said first position to said second position.

7. A rotor/wing apparatus for a rotor/wing aircraft comprising:
   a rotor hub rotatable about an azimuthal axis;
   a first rotor blade attached to and extending radially outward from said rotor hub, said first rotor blade being pivotable about a first pitch axis extending substantially radially outward from said azimuthal axis;
   a rotatable swashplate, said rotatable swashplate being selectably axially translatable and tiltable relative to said azimuthal axis; a first pitch link having a first upper end and a first lower end, said first upper end being attached to said first rotor blade eccentric of said first pitch axis, said first lower end being operatively attached to said rotatable swashplate, said first pitch link moving in response to said rotatable swashplate to provide collective and cyclic pitch of said first rotor blade about said first pivot axis; and
   a separate locking link moveable from a first position in which said locking link engages said first lower end to constrain said first pitch link against movement to a second position in which said link disengages from said first lower end to permit said first pitch link to move in response to said rotatable swashplate.

8. The rotor/wing apparatus of claim 7, further comprising:
   a frame rigidly mounted to said rotor/wing aircraft;
   a pivot shaft rotatably mounted to said frame, said pivot shaft having first and second shaft ends; and wherein said locking link further comprises an arm member having an attachment end attached to said first shaft end, said arm member being pivotable about said pivot shaft to move said proximal end from said first position to said second position.

9. The rotor/wing apparatus of claim 8, further comprising:

an actuator attached to said pivot shaft for causing said locking link to move from said second position to said first position.

10. The rotor/wing apparatus of claim 8, further comprising:

a bell crank arm attached to said second shaft end, said bell crank arm having a pivoting end and a free end; and a linear actuator attached to said free end, said linear actuator adapted to rotate said pivot shaft for causing said locking link to move from said second position to said first position.

11. The rotor/wing apparatus of claim 7, further comprising:

a second rotor blade attached to and extending radially outward from said rotor hub, said second rotor blade being pivotable about a second pitch axis extending substantially radially outward from said azimuthal axis; and a second pitch link having a second upper end and a second lower end, said second upper end being attached to said second rotor blade eccentric of said second pitch axis said second pitch link being operatively attached to said rotatable swashplate.

12. The rotor/wing apparatus of claim 11 further comprising:

a second separate locking link moveable from an engaged position in which said second locking link engages said second lower end to constrain said second pitch link against movement to a disengaged position in which said link disengages from said second lower end to permit said second pitch link to move in response to said rotatable swashplate.

* * * * *